United States Patent
Takeuchi et al.

(10) Patent No.: US 10,099,589 B2
(45) Date of Patent: Oct. 16, 2018

(54) HEADREST GUIDE

(71) Applicants: TS TECH CO., LTD., Asaka-shi, Saitama (JP); HONDA MOTOR CO., LTD., Tokyo (JP)

(72) Inventors: Makoto Takeuchi, Saitama (JP); Akimitsu Kurihara, Reynoldsburg, OH (US); Masaru Tsukamoto, Reynoldsburg, OH (US); Ganapathy Srinivasan, Reyunoldsburg, OH (US); Ganesh Narayanan, Raymond, OH (US); Jeffrey Scheurer, II, Raymond, OH (US); Masakazu Okada, Raymond, OH (US); Ronald C. Cozzo, Raymond, OH (US)

(73) Assignees: TS Tech Co., Ltd., Saitama (JP); Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/438,193

(22) Filed: Feb. 21, 2017

(65) Prior Publication Data

US 2018/0236911 A1    Aug. 23, 2018

(51) Int. Cl.
*B60N 2/80* (2018.01)
*B60N 2/824* (2018.01)
*B60N 2/897* (2018.01)

(52) U.S. Cl.
CPC .............. *B60N 2/80* (2018.02); *B60N 2/824* (2018.02); *B60N 2/897* (2018.02)

(58) Field of Classification Search
CPC . B60N 2/48; B60N 2/80; B60N 2/809; B60N 2/821; B60N 2/824; B60N 2/897; B60N 2002/4897; B60N 2205/20
USPC .................................................. 297/391, 410
See application file for complete search history.

(56) References Cited

U.S. PATENT DOCUMENTS

| | | | |
|---|---|---|---|
| 8,967,721 B2 * | 3/2015 | Muto | B60N 2/4823 297/410 |
| 9,004,803 B2 | 4/2015 | Wanke et al. | |
| 9,902,301 B2 * | 2/2018 | Aquillue | B60N 2/80 |
| 2016/0332545 A1 * | 11/2016 | Segura | H01R 13/631 |

FOREIGN PATENT DOCUMENTS

| | | | | |
|---|---|---|---|---|
| DE | 19608851 A1 * | 9/1997 | | B60N 2/815 |
| DE | 102011100819 A1 * | 11/2012 | | B60N 2/809 |
| DE | 102014226276 A1 * | 6/2016 | | B60N 2/68 |
| DE | 102015100751 A1 * | 7/2016 | | B60N 2/4814 |
| EP | 2749448 A1 * | 7/2014 | | B60N 2/809 |
| FR | 2877287 A1 * | 5/2006 | | B60N 2/812 |
| JP | 2012254648 A * | 12/2012 | | B60N 2/4823 |
| WO | WO-2016198692 A1 * | 12/2016 | | B60N 2/809 |

* cited by examiner

*Primary Examiner* — Ryan D Kwiecinski
(74) *Attorney, Agent, or Firm* — Drinker Biddle & Reath LLP

(57) ABSTRACT

A headrest guide includes: a tubular portion that extends in a first direction and into which a stay is inserted; a tongue piece protruding partially to the inside of the tubular portion, the tongue piece being configured to bend in a radial direction of the tubular portion and being configured to be brought into contact with the stay; and a plate spring pressing the tongue piece inwardly in the radial direction of the tubular portion. Protruding portions are disposed on opposite sides of the tubular portion, respectively, with the tongue piece interposed therebetween to hold the plate spring at opposite end sides thereof.

8 Claims, 9 Drawing Sheets

HEADREST GUIDE

BACKGROUND

The present disclosure relates to a headrest guide and particularly pertains to a headrest guide for attaching a headrest stay.

There has been a well-known transportation seat including a headrest guide for attaching a headrest stay to a seat back. For example, as described in U.S. Pat. No. 9,004,803 (U.S. Pat. No. 9,004,803 B2), a headrest guide includes: a tubular portion (a socket portion in U.S. Pat. No. 9,004,803 B2) into which a headrest stay (a headrest rod in U.S. Pat. No. 9,004,803 B2) is inserted; a stay contact portion (a spring tongue in U.S. Pat. No. 9,004,803 B2) contactable with the headrest stay; and a resilient member (a plate spring in U.S. Pat. No. 9,004,803 B2) pressing against the stay contact portion inwardly in a radial direction of the tubular portion for holding the headrest stay.

The resilient member described in U.S. Pat. No. 9,004,803 B2 is attached to a holding portion (a catching portion in U.S. Pat. No. 9,004,803 B2), which is formed integrally with the tubular portion, in a cantilevered manner such that an end thereof contactable with the stay contact portion serves as a free end. In addition, the headrest stay is pressed inwardly in the radial direction of the tubular portion by a restoring force of the free end of the stay contact portion in the elastically deformed state, thereby suppressing the looseness of the headrest stay relative to the headrest guide. Furthermore, U.S. Pat. No. 9,004,803 B2 describes that a removing means (a release means in U.S. Pat. No. 9,004,803 B2) is formed on a lower end side of the resilient member in order to restrict the resilient member from moving in an up-to-down direction (a direction along a longitudinal direction of the tubular portion), and also describes that a contact member (an abutment member in U.S. Pat. No. 9,004,803 B2) is formed to be brought into contact with the removing means.

However, the plate spring provided in the headrest guide described in U.S. Pat. No. 9,004,803 B2 has a fixed end and the free end, and presses against the stay contact portion in a so-called cantilevered manner. Thus, the plate spring attached to a body of the headrest guide in the cantilevered manner receives a larger bending moment toward the fixed end due to a reaction force applied from the stay contact portion. Therefore, a pressing force of the plate spring is likely to be weakened due to use over the years. As a result, the attachment stability of the headrest stay may be reduced.

In addition, the plate spring attached to the tubular portion in the cantilevered manner is required to apply a sufficient inward load in the radial direction of the tubular portion to the stay contact portion for holding the headrest stay. Therefore, the plate spring is formed to be elongated with the length from the fixed end to the free end. As a result, the material cost is increased due to the length thereof.

Furthermore, in the tubular portion, a hole of the holding portion extends in the up-to-down direction. The resilient member is inserted through the hole to be held therein. In order to attach the resilient member by using only the holding portion, a fitting clearance between the resilient member and the holding portion needs to have a minimum size such that the resilient member does not fall out by its own weight. In this case, it is difficult to insert the resilient member through the hole of the holding portion, therefore making mounting of the resilient member difficult. Meanwhile, even in the configuration where the removing means is attached to the contact member formed in the tubular portion, it requires additional work to lock the removing means to the contact member.

SUMMARY

The present disclosure has been made in view of the above-mentioned problems. Various embodiments of the present disclosure provide a headrest guide that can enhance the attachment stability of a headrest stay. Some embodiments of the present disclosure reduce a cost of the headrest guide. Some embodiments of the present disclosure facilitate the mounting of a resilient member to a tubular portion.

Some of the above-mentioned problems are solved by a headrest guide according to an embodiment of the present disclosure. A stay for supporting a headrest is inserted into the headrest guide. The headrest guide includes: a tubular portion that extends in a first direction and into which the stay is inserted; a stay contact portion that is provided so as to bend in a radial direction of the tubular portion and is configured to be brought into contact with the stay; and a resilient member that presses against the stay contact portion inwardly in the radial direction of the tubular portion. Holding portions are disposed on opposite sides of the tubular portion, respectively, with the stay contact portion interposed between the opposite sides, to hold the resilient member at opposite end sides thereof.

According to the above configuration, the resilient member is held at the opposite sides thereof by the holding portions for holding the opposite end sides of the resilient member, and a center portion thereof can press against the stay contact portion. Therefore, compared to the case where the resilient member is held in a cantilevered manner, the resilient member can more strongly press against the stay contact portion, thereby further enhancing the attachment stability of the stay by the headrest guide.

The stay contact portion may extend in the first direction in which the tubular portion extends, and the resilient member may be a plate spring that extends in a second direction that intersects with the first direction in which the tubular portion extends. According to the above configuration, since the plate spring extends in the second direction that intersects with the first direction of the tubular portion, namely, in the direction that intersects with the first direction of the stay contact portion, the length of the plate spring can be reduced, thereby reducing the material cost.

Each of the holding portions may be composed of a protruding portion that includes a slit and protrudes outwardly from the tubular portion, and the plate spring may be fittedly inserted into the slit. According to the above configuration, since the holding portion is composed of the protruding portion including the slit, the plate spring is inserted into the slit and thereby can be easily mounted to the protruding portion formed in the tubular portion. In other words, tolerances for fitting dimensions for mounting the plate spring to the headrest guide are relaxed, thereby facilitating mounting operations of the plate spring. In addition, providing the protruding portion protruding from the tubular portion can enhance the rigidity of the holding portions.

The slit may extend in the first direction in which the tubular portion extends. According to the above configuration, since the slit extends in the first direction, a surrounding area of the slit is not required to be longer in the second direction that intersects with the first direction, thereby providing a more compact headrest guide.

A guiding portion may be provided on a side of the holding portion where the plate spring is inserted and may guide the insertion of the plate spring into the slit. According to the above configuration, since the guiding portion is provided on the side of the holding portion where the plate spring is inserted, the insertion of the plate spring into the slit is guided by the guiding portion when the plate spring is mounted to the headrest guide, thereby facilitating the mounting of the plate spring.

A positioning portion may be provided on a side of the stay contact portion where the resilient member is provided and may determine a mounting position of the resilient member, and the positioning portion may be provided between the holding portions that are disposed on the opposite sides of the tubular portion, respectively, with the stay contact portion interposed between the opposite sides. According to the above configuration, since the positioning portion is provided between the holding portions that are disposed on the opposite sides of the tubular portion, respectively, with the stay contact portion interposed between the opposite sides, the resilient member can be easily positioned relative to the stay contact portion by the positioning portion and the plate spring is not likely to fall out of the holding portions.

The two or more holding portions may be provided so as to hold the opposite ends of the resilient member and may protrude outwardly from the tubular portion, and a connecting portion may be provided in the tubular portion to connect at least two of the holding portions. According to the above configuration, since the connecting portion is provided in the tubular portion to connect at least two holding portions of the two or more holding portions, the rigidity of the holding portions can be enhanced.

A rib may be provided on an outer periphery of the tubular portion to protrude outwardly, and the connecting portion may be connected with the rib. According to the above configuration, since the connecting portion is provided connected with the rib protruding outwardly from the tubular portion, the rigidity of the holding portions connected by the connecting portion can be further enhanced.

One end of the stay contact portion may be a free end and the other end of the stay contact portion may be a fixed end, and the resilient member may be in contact with the stay contact portion at a position distant from the other end of the stay contact portion. According to the above configuration, the resilient member is brought into contact with the stay contact portion at a position distant from the fixed end of the stay contact portion, and the resilient member does not press against the fixed end which does not bend even when being pressed. Therefore, the resilient member can effectively press against the stay contact portion. As a result, not only the resilient member but also the slits through which the resilient member is inserted and the holding portions for holding the resilient member can be compactly configured.

The positioning portion may be provided on the side of the stay contact portion where the resilient member is provided and may determine the mounting position of the resilient member, and the positioning portion may be provided on the one end side of the stay contact portion. According to the above configuration, the positioning portion is provided on the one end side serving as the free end of the stay contact portion, and the resilient member is positioned by the positioning portion. Therefore, the resilient member can further effectively press against the stay contact portion.

According to an embodiment of the present disclosure, compared to a configuration where a resilient member is held in a cantilevered manner, the stay contact portion can be more strongly pressed by the resilient member, thereby further enhancing the attachment stability of the stay by the headrest guide. According to an embodiment of the present disclosure, the length of the plate spring can be short, thereby reducing the material cost. According to an embodiment of the present disclosure, the plate spring serving as the resilient member can be easily mounted on the protruding portions formed in the tubular portion, and the rigidity of the holding portions can be further enhanced. According to an embodiment of the present disclosure, a more compact headrest guide can be achieved. According to an embodiment of the present disclosure, the resilient member can be easily positioned relative to the stay contact portion, and the plate spring can be less likely to fall out of the holding portions. According to an embodiment of the present disclosure, the rigidity of the holding portions can be enhanced. According to an embodiment of the present disclosure, the resilient member can effectively press against the stay contact portion, and not only the resilient member but also the slits through which the resilient member is inserted and the holding portion for holding the plate spring can be compactly configured.

DETAILED DESCRIPTION

Various configurations of a headrest guide according to embodiments of the present disclosure are described below. The embodiments have been set forth as mere examples for the purpose of understanding of the present disclosure, and is not intended to limit the present disclosure. Changes and modifications can be made to the embodiments described herein without departing from the scope of the present disclosure, and it will be understood that the embodiments may include all equivalents thereof.

In the descriptions below, a "front-to-back direction" means a front-to-back direction as viewed from a passenger seated on a seat. A "seat width direction" means a lateral direction of a seat and is coincident with a right-to-left direction as viewed from a passenger seated on a seat. A "height direction" means a height direction of a seat and is coincident with an up-to-down direction as a seat is viewed from the front side thereof.

Basic Configuration of Seat Frame

Figure 1:
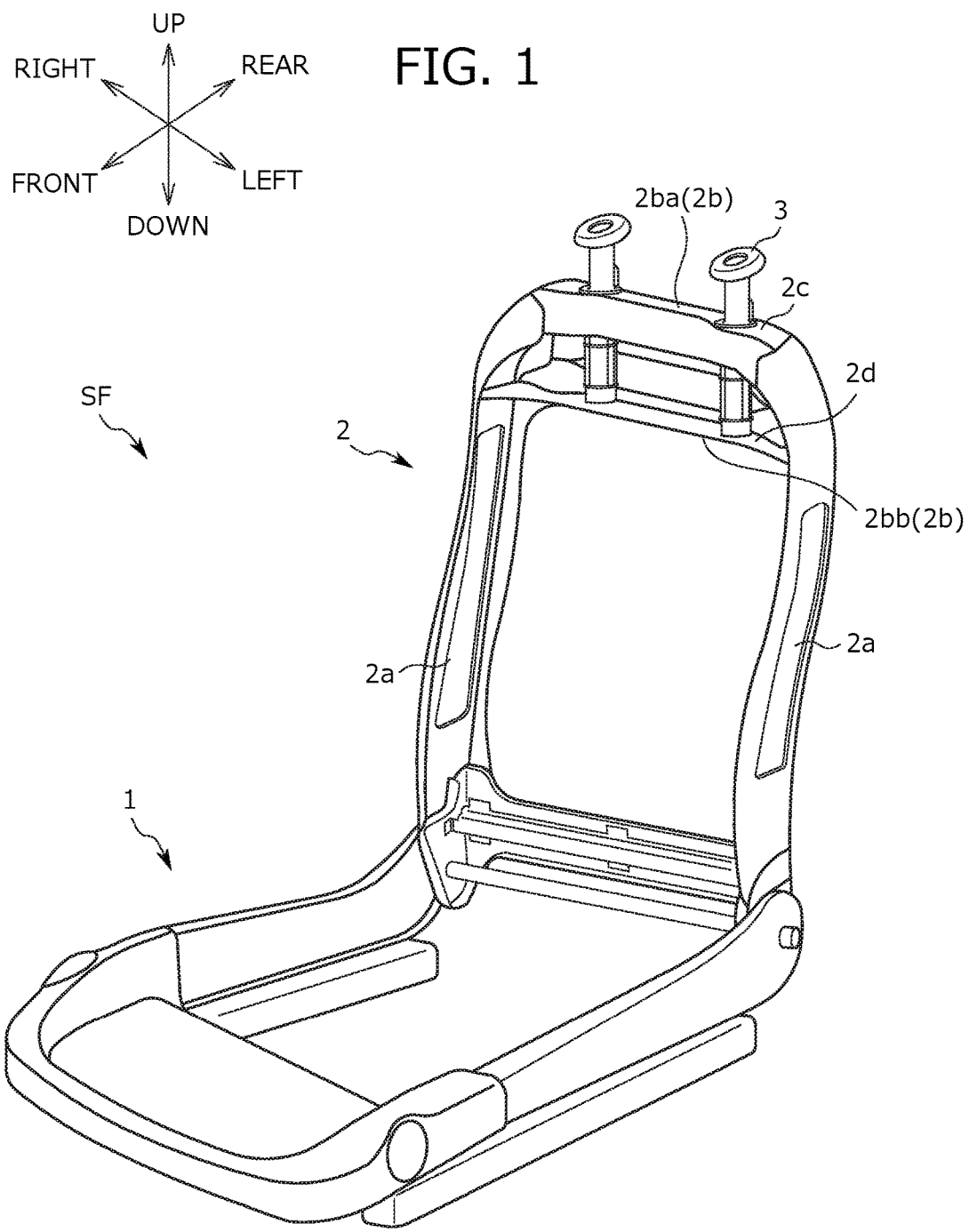
FIG. 1 is a perspective view of a seat frame according to an embodiment of the present disclosure.

A basic configuration of a seat frame SF including a headrest guide 3 according to an embodiment is described with reference to FIG. 1. FIG. 1 is a perspective view of a seat frame SF according to an embodiment of the present disclosure. The seat frame SF has substantially the same configuration as a well-known, typical seat frame, other than a shape and a configuration of a headrest guide 3 provided in the seat frame SF. The seat frame SF includes a seat cushion frame 1 and a seat back frame 2, as shown in FIG. 1. The seat cushion frame 1 is a framework of a seat cushion on which a passenger is to be seated. The seat back frame 2 is a framework of a seat back serving as a backrest for a passenger and is connected to the rear side of the seat cushion frame 1 such that the seat back frame 2 can rotate relative to the seat cushion frame 1.

The seat back frame 2 includes right and left side frames 2a and an upper frame 2b. The right and left side frames 2a are provided on respective sides in the seat width direction (in other words, on the right and left sides of the seat frame SF, respectively). The upper frame 2b is attached to connect upper portions of the right and left side frames 2a. The upper frame 2b includes an upper member 2ba and a lower member 2bb. The upper member 2ba is formed substantially continuously with upper end portions of the side frames 2a. The lower member 2bb is attached below the upper end portions of the side frames 2a and is positioned below the upper member 2ba.

The upper member 2ba extends in the seat width direction and has a U-shaped cross section. The upper member 2ba is joined to the side frames 2a by welding or the like such that an opening thereof faces downwardly. Two attachment holes 2c, namely, right and left attachment holes 2c, for attaching the headrest guide 3, are formed in the upper member 2ba to extend therethrough in the up-to-down direction. A lower portion of the headrest guide 3 extends through each of the attachment holes 2c. The lower member 2bb extends in the seat width direction and has an L-shaped cross section. The lower member 2bb is joined to the side frames 2a by welding or the like. Two attachment holes 2d, namely, right and left attachment holes 2d (provided below the attachment holes 2c in-line with the attachment holes 2c), for attaching the headrest guide 3, are formed in the lower member 2bb to extend through in the up-to-down direction. A lower end portion of the headrest guide 3 extends through each of the attachment holes 2d.

Schematic Configuration of Headrest Guide

Figure 2:
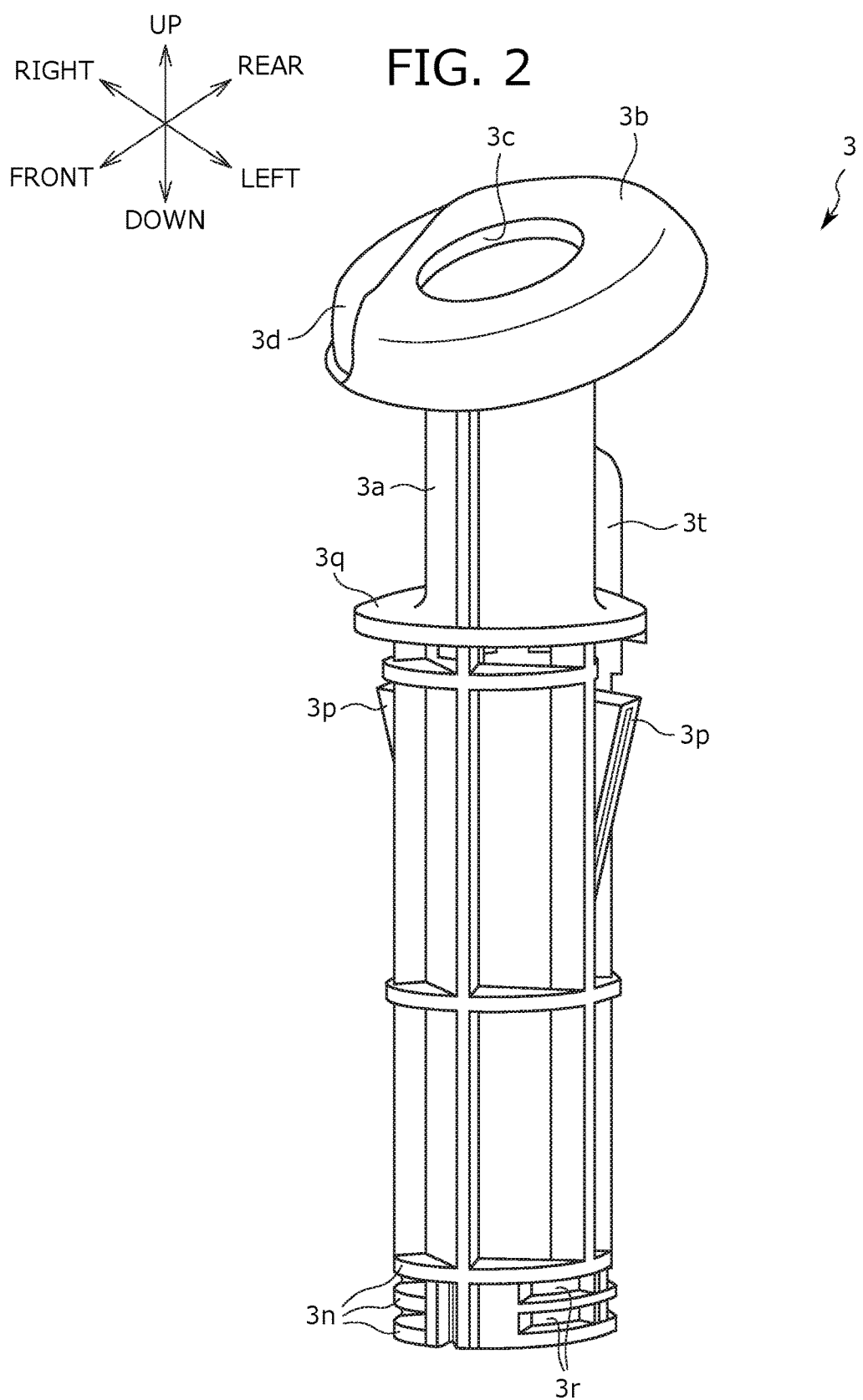
FIG. 2 is a perspective view of a front side of a headrest guide, according to an embodiment.
Figure 3:
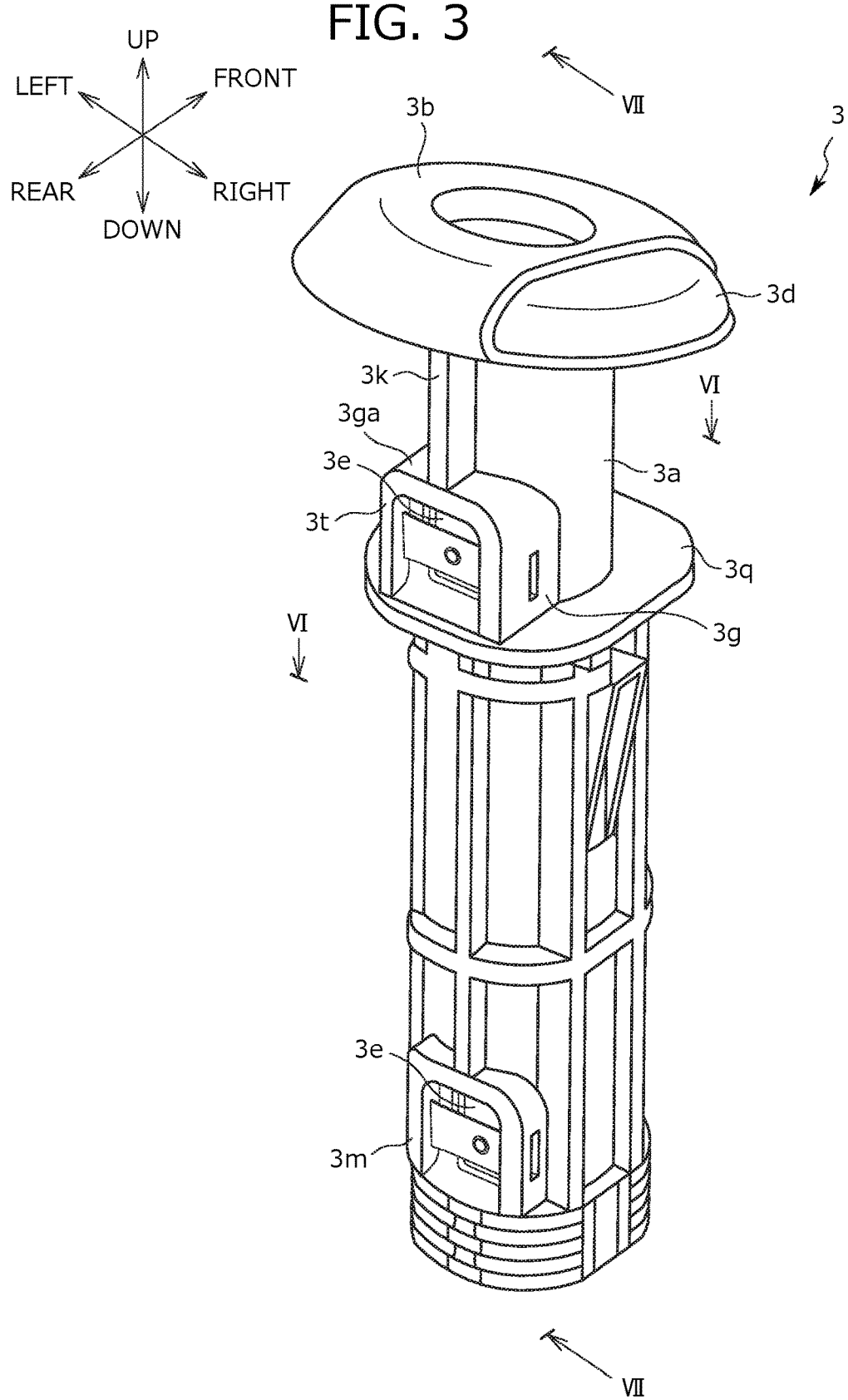
FIG. 3 is a perspective view of the headrest guide showing a rear side of the headrest guide, according to an embodiment.
Figure 4:
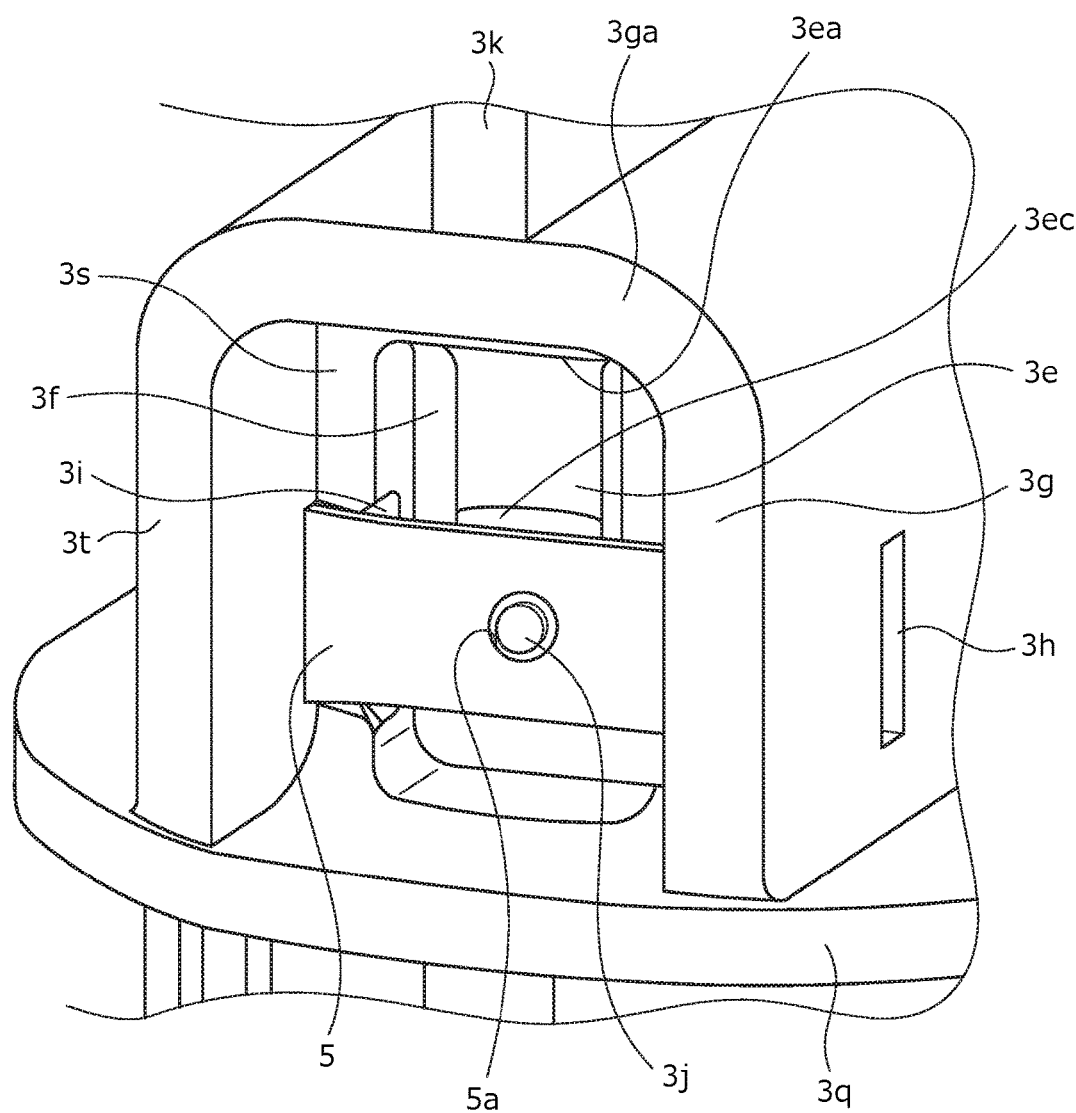
FIG. 4 is a partial, perspective view of the headrest guide showing a tongue piece, a plate spring, and a surrounding area thereof, according to an embodiment.

Next, a schematic configuration of the headrest guide 3 is described with reference to mainly FIGS. 2 to 4. FIG. 2 is a perspective view of a front side of the headrest guide 3, according to an embodiment. FIG. 3 is a perspective view of the headrest guide 3 showing a rear side of the headrest guide 3, according to an embodiment. FIG. 4 is a partial, perspective view of the headrest guide showing a tongue piece 3e, a plate spring 5, and a surrounding area thereof, according to an embodiment. The headrest guide 3 is made of mainly synthetic resin, and a headrest stay 4 for supporting a headrest (not shown) is inserted into the center of the headrest guide 3. As shown in FIGS. 2 and 3, the headrest guide 3 mainly includes a tubular portion 3a and a disk-shaped head portion 3b. The tubular portion 3a formed into a tube extends substantially in the up-to-down direction. The head portion 3b formed at an upper end portion of the tubular portion 3a has a diameter larger than that of the tubular portion 3a.

A knob operation portion 3d is attached in the head portion 3b to be slidable in a right-to-left direction (a direction orthogonal to an extending direction of the tubular portion 3a). The knob operation portion 3d fixes a vertical position of the headrest stay 4 inserted into an insertion hole 3c.

The insertion hole 3c is axially formed at the center of the tubular portion 3a to communicate with the head portion 3b and extend therefrom in the up-to-down direction. The headrest stay 4 (see FIG. 8B) is inserted into the insertion hole 3c. The insertion hole 3c forms an internal space of the tubular portion 3a and extends through the tubular portion 3a in the up-to-down direction. In addition, a plate-shaped flange portion 3q is formed on an upper side of the tubular portion 3a. The flange portion 3q extending substantially perpendicular to the extending direction of the tubular portion 3a can enhance the attachment stability of the headrest guide 3 to the upper member 2ba. The headrest guide 3 is attached to the upper member 2ba with the flange portion 3q in contact with an upper surface of the upper member 2ba.

Protruding portions 3g, 3t formed to extend rearward of the seat (outwardly from the tubular portion 3a) are positioned at an upper portion of the flange portion 3q of the tubular portion 3a in a state where the plate spring 5 described below is interposed between the protruding portions 3g, 3t. The protruding portions 3g, 3t serve as holding portions for holding the plate spring 5. As shown in FIG. 4, slits 3h are formed in the protruding portions 3g, 3t, respectively. The slits 3h elongated in the up-to-down direction, namely, in the extending direction of the tubular portion 3a, are formed to extend in the right-to-left direction and extend through the protruding portions 3g, 3t. The plate spring 5 described below is inserted in the right-to-left direction through the slits 3h formed in the protruding portions 3g, 3t, and both ends of the plate spring 5 are held by the slits 3h (in other words, both ends of the plate spring 5 are fittedly inserted into the slits 3h). Thus, since the plate spring 5 can be inserted in the right-to-left direction into the slits 3h extending in the right-to-left direction, hands of an operator are unlikely to come into contact with the tubular portion 3a extending in the up-to-down direction, thereby facilitating the mounting operation of the plate spring 5.

Upper ends of the protruding portions 3g, 3t are connected by a connecting portion 3ga formed integrally with the protruding portions 3g, 3t. A rib 3k is integrally formed at the center of an upper surface of the connecting portion 3ga in the right-to-left direction. The rib 3k protrudes radially outward from an outer periphery of the tubular portion 3a and extends to the head portion 3b. Providing the rib 3k enhances the rigidity of the protruding portions 3g, 3t.

As shown in FIG. 3, a protruding portion 3m serving as a holding portion is formed on a lower end side of the tubular portion 3a. The protruding portion 3m has the similar configuration to the protruding portions 3g, 3t except that the amount of protrusion of the protruding portion 3m is smaller than the amount of protrusion of the protruding portions 3g, 3t. The tongue piece 3e serving as a stay contact portion described below is pressed by the plate spring 5 attached in the protruding portions 3g, 3t or 3m, thereby being attached to be in contact with the headrest stay 4. The headrest stay 4 is pressed from the upper and lower positions thereof by the tongue piece 3, thereby enhancing the attachment stability of the headrest stay 4 to the headrest guide 3.

Two grooves 3r extending in a circumferential direction are formed in the vicinity of a lower end portion of the tubular portion 3a so as to overlap each other in the up-to-down direction. Protrusions 3n are formed in the vicinity of the lower end portion of the tubular portion 3a to be opposite to the two grooves 3r in the right-to-left direction and to protrude radially outward of the grooves 3r. The protrusions 3n are crushed by a load applied when the lower end portion of the tubular portion 3a of the headrest guide 3 is inserted into each of the attachment holes 2d of the lower member 2bb, and the protrusions 3n are brought into contact with an inner periphery of the attachment hole 2d. Therefore the protrusions 3n are brought into close contact with the inner periphery. Namely, at least the distance from the center of the tubular portion 3a to a radially outer end of each of the protrusions 3n is slightly larger than a radius of the attachment hole 2d such that the protrusions 3n can be partially crushed when being inserted thorough the attachment hole 2d. In this way, the protrusions 3n are crushed to be brought into close contact with the inner periphery of the attachment hole 2d; thereby, the headrest guide 3 is supported by the lower member 2bb.

Two protrusions 3p are formed directly below the flange portion 3q of the tubular portion 3a. The two protrusions 3p extend from different positions on the tubular portion 3a in the opposite directions in the right-to-left direction of the seat. Each of the protrusions 3p is formed spaced from the flange portion 3q to have a U-shape with an opening facing downwardly as viewed from the lateral side. In addition, the protrusions 3p are formed plane-symmetrically with respect to a surface including the center line of the tubular portion 3a in the up-to-down direction. Furthermore, each of the protrusions 3p is formed in a tapered shape such that the amount of radially outward protrusion thereof decreases from the upper side to the lower side.

The protrusions 3p are crushed by a load applied when the tubular portion 3a of the headrest guide 3 is inserted into each of the attachment holes 2c of the upper member 2ba, and the protrusions 3p are brought into contact with an inner periphery of the attachment hole 2c. Therefore, the protrusions 3p are brought into close contact with the inner periphery. Namely, at least the distance from the center of the tubular portion 3a to an end of each of the protrusions 3p most protruded radially outwardly is slightly larger than a radius of the attachment hole 2c such that the protrusions 3p can be partially crushed when being inserted thorough the attachment hole 2c. In this way, the protrusions 3p are crushed to be brought into close contact with the inner periphery of the attachment hole 2c; thereby, the headrest guide 3 is supported by the upper member 2ba.

Configuration of Tongue Piece, Plate Spring and Surrounding Area Thereof

Figure 5:
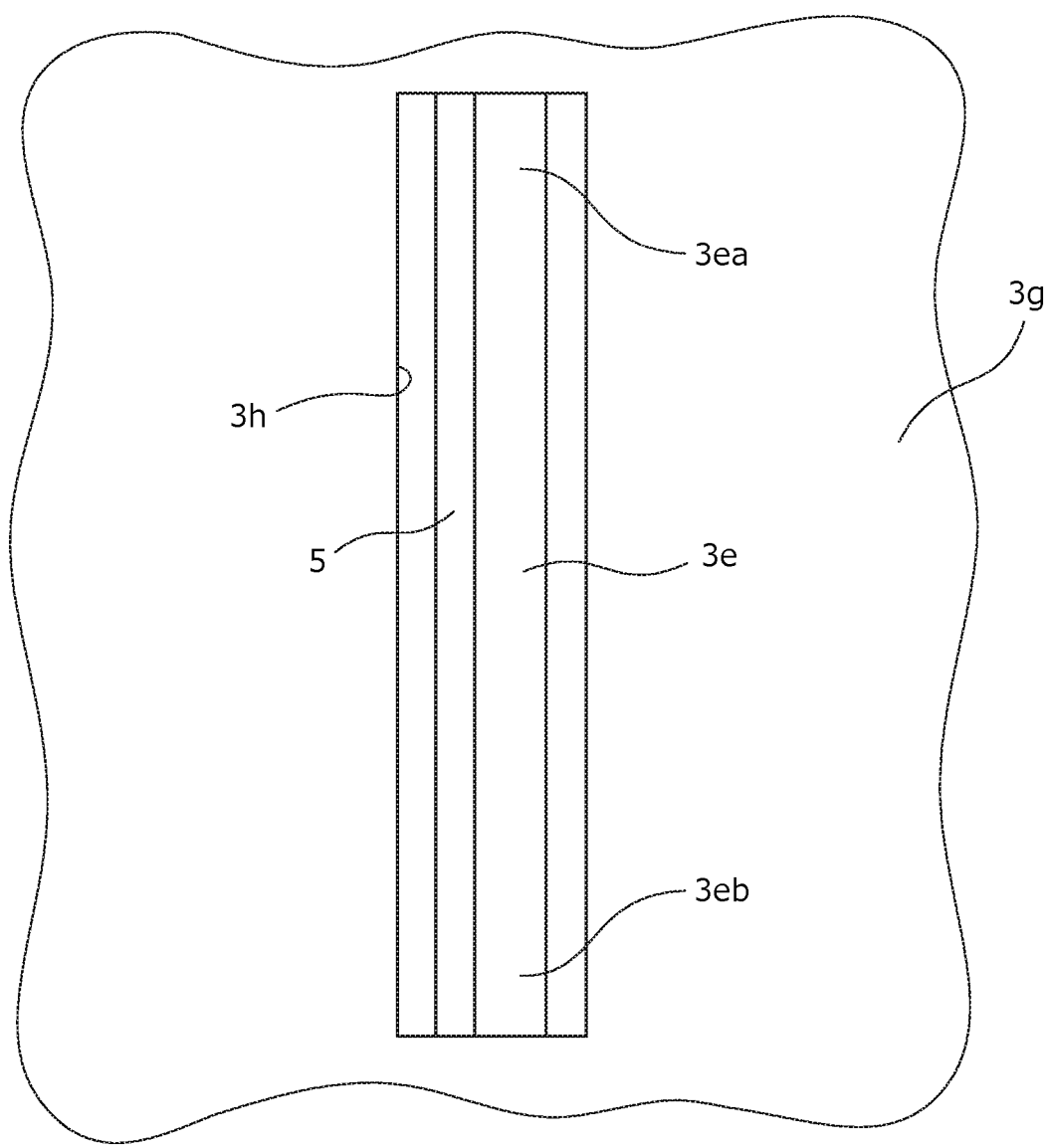
FIG. 5 is a partial, side view of the headrest guide showing a slit through which the plate spring is inserted, according to an embodiment.
Figure 6:
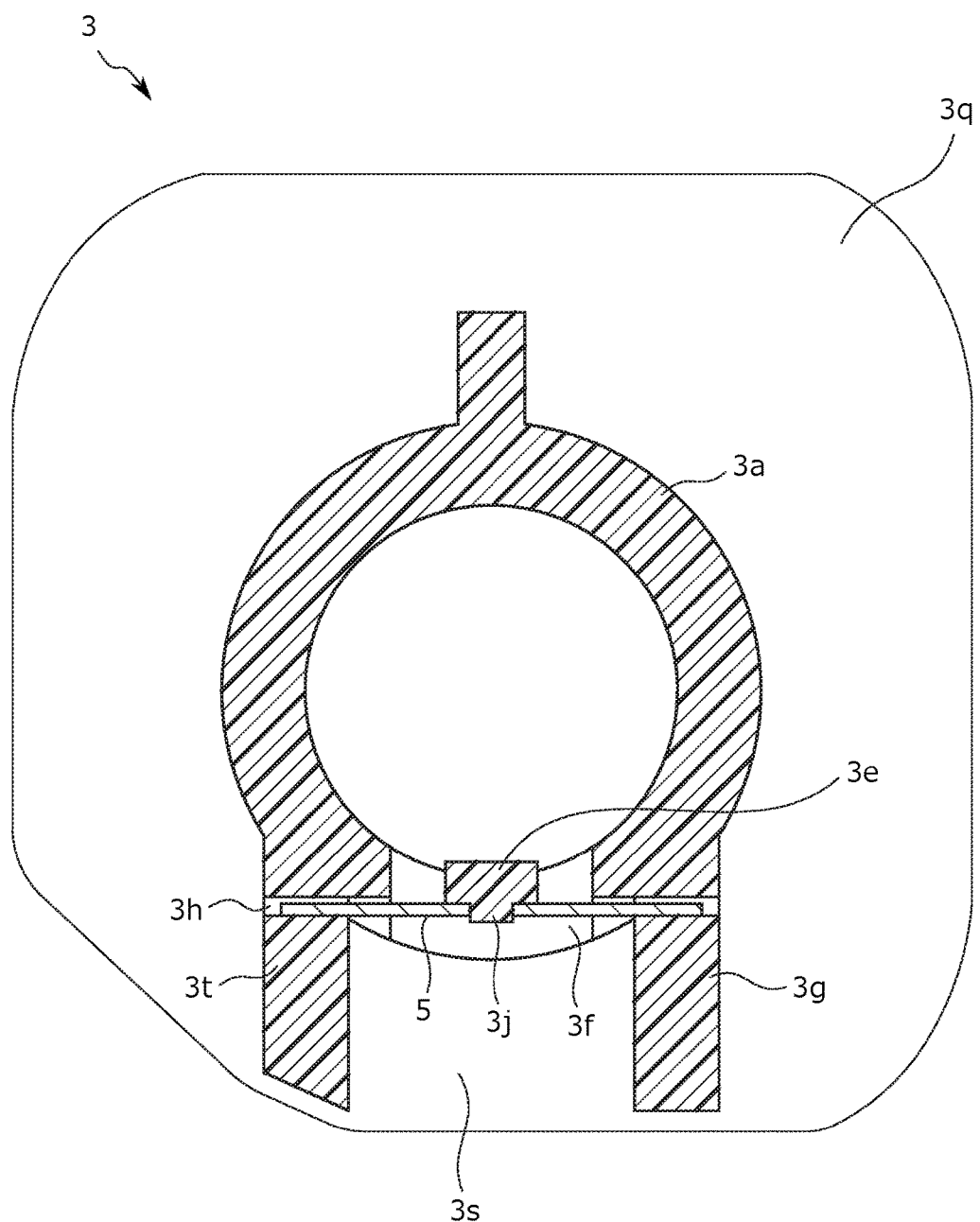
FIG. 6 is a cross-sectional view of the headrest guide taken along line VI-VI of FIG. 3, according to an embodiment.

Next, the tongue piece 3e formed at the headrest guide 3, and the plate spring 5 for pressing against the tongue piece 3e inwardly in a radial direction of the tubular portion 3a is described with reference to FIGS. 4, 5 and 6. FIG. 5 is a partial, side view of the headrest guide 3 showing each of the slits 3h into which the plate spring 5 inserted, according to an embodiment. FIG. 6 is a cross-sectional view of the headrest guide 3 taken along line VI-VI of FIG. 3. In the descriptions below, a configuration of the protruding portions 3g, 3t for supporting the plate spring 5 and a surrounding area thereof is described in detail, and for the purpose of easy understanding, the description of the protruding portion 3m having the similar function to the protruding portions 3g, 3t is omitted.

The tongue piece 3e extends in the extending direction of the tubular portion 3a (substantially in the up-to-down direction). The tongue piece 3e has a fixed end 3ea serving as an upper end (the other end) thereof formed integrally with the tubular portion 3a, thereby being attached to the tubular portion 3a in a cantilevered manner. A space 3f is formed in the tubular portion 3a so as to connect to the insertion hole 3c passing through an axial center of the tubular portion 3a. The space 3f extends through the tubular portion 3a in the radial direction of the tubular portion 3a to have a substantially U-shape as viewed from the rear side. A free end 3eb serving as a lower end (one end) of the tongue piece 3e is formed separately from the tubular portion 3a with the space 3f to be bendable in the radial direction of the tubular portion 3a. As specifically described below, the tongue piece 3e is configured to be pressed radially inward by the plate spring 5 brought into contact with a projection 3ec described below, therefore protruding radially inward from an inner surface of the insertion hole 3c of the tubular portion 3a.

In addition, the projection 3ec is formed at the free end 3eb serving a lower end of the tongue piece 3e. The projection 3ec is more projected than other portions of the tongue piece 3e to be brought into contact with the plate spring 5. Specifically, the thickness of the projection 3ec is largest at the center portion thereof. A positioning protrusion 3j having a circular shape in cross-section is formed at the midpoint of the center portion in the right-to-left direction to protrude outwardly in the radial direction of the tubular portion 3a. The positioning protrusion 3j is a positioning portion configured to be brought into engagement with a through-hole 5a described below, to determine a mounting position of the plate spring 5. In this way, since the positioning protrusion 3j is formed to have the circular shape in cross-section, a load applied from the plate spring 5 to the positioning protrusion 3j can be distributed. Providing the positioning protrusion 3j can enhance the shape retaining property of the plate spring 5. Furthermore, the positioning protrusion 3j can be easily fitted into the after-mentioned circular through-hole 5a formed in the plate spring 5, thereby facilitating the mounting of the plate spring 5.

The plate spring 5 is a plate-shaped resilient member made of a metal material. The plate spring 5 is inserted into the slits 3h of the protruding portions 3g, 3t protruding rearward from the tubular portion 3a; thereby, the both ends of the plate spring 5 are held in the slits 3h. In addition, the plate spring 5 is attached so as to extend in a vehicle right-to-left direction intersecting with the up-to-down direction that is the extending direction of the tubular portion 3a. Furthermore, the plate spring 5 is provided at the radially outward side of the protruding portions 3g, 3t and is attached not to the fixed end 3ea positioned at the upper end of the tongue piece 3e, but to the free end 3eb positioned at the lower end of the tongue piece 3e so as to face particularly the projection 3ec. Namely, the plate spring 5 is brought into contact with the projection 3ec provided at the free end of the tongue piece 3e to press the bendable tongue piece 3e; therefore, the load for pressing the tongue piece 3e inwardly in the radial direction of the tubular portion 3a is effectively transmitted to the tongue piece 3e.

In addition, the plate spring 5 is provided on the rear side of the tubular portion 3a. A large load generated by acceleration or deceleration in the front-to-back direction is applied from a seated passenger or the like to the seat frame SF for a vehicle seat. As just described, the plate spring 5 is provided on the rear side of the tubular portion 3a and the tongue piece 3e is therefore pressed forward. As a result, wobbling of the headrest stay 4 brought into contact with the tongue piece 3e can be effectively suppressed.

Furthermore, the circular through-hole 5a is formed at the center of the plate spring 5. The through-hole 5a engageable with the above-described positioning protrusion 3j of the tongue piece 3e extends through the plate spring 5 in the thickness direction thereof. A lower end of the plate spring 5 is positioned below the lower end serving as the free end 3eb of the tongue piece 3e. In this way, since the lower end of the plate spring 5 is positioned below the lower end of the tongue piece 3e, the lower end of the bendable tongue piece 3e can be prevented from being scratched by corner portions of the plate spring 5 at the lower end thereof having the strength higher than that of the tongue piece 3e.

As described above, the positioning protrusion 3j is formed in the tongue piece 3e and the through-hole 5a engageable with the positioning protrusion 3j is formed in the plate spring 5. However, as long as the relative position between the tongue piece 3e and the plate spring 5 can be restricted, the position of the positioning protrusion 3j and the position of the through-hole 5a may be reversely provided. Namely, a positioning protrusion (not shown) may be formed in the plate spring 5 and a through-hole engageable with the positioning protrusion may be formed in the tongue piece 3e. In addition, alternatively, the through-hole may be a bottomed hole having a recessed opposing surface which is opposite to the positioning protrusion 3j.

As shown in FIG. 4, the tongue piece 3e and the plate spring 5 covering a portion of the tongue piece 3e are provided to be exposed in a recessed portion 3s. The recessed portion 3s surrounded by the protruding portions 3g, 3t, the connecting portion 3ga, and the flange portion 3q is a space recessed inward of these components in the radial direction of the protruding portions 3g, 3t. Since the tongue piece 3e and the plate spring 5 are provided as described above, an operator can adjust the mounted state of the plate spring 5 to the protruding portions 3g, 3t and the engagement state between the plate spring 5 and the tongue piece 3e, with fingers of the operator inserted in the recessed portion 3s. In addition, after the plate spring 5 is assembled to the protruding portions 3g, 3t, a protection member (not shown) may be attached in the recessed portion 3s to prevent the entry of foreign substances between the plate spring 5 and the tongue piece 3e.

As shown in FIG. 4, a tapered groove 3i is formed in the tubular portion 3a to be located on the line extending from one of the slits 3h formed in the protruding portions 3g, 3t; in other words, the tapered groove 3i is provided on a side of the tubular portion 3a, which is surrounded by the protruding portions 3g, 3t facing each other. The tapered groove 3i serves as a guiding portion for guiding the insertion of the plate spring 5 into the slit 3h. The tapered groove 3i is formed such that the vertical length thereof decreases from the tongue piece 3e toward one of the protruding portions 3g, 3t. Conversely, the tapered groove 3i is formed such that the vertical length thereof increases from the one of the protruding portions 3g, 3t toward the tongue piece 3e. Therefore, when the plate spring 5 is inserted from one of the slits 3h formed in the protruding portions 3g, 3t between which the tongue piece 3e is interposed, into the other of the slits 3h formed in the protruding portions 3g, 3t, the plate spring 5 is guided by the tapered groove 3i. Since the tapered groove 3i is formed as described above, the plate spring 5 can be easily inserted into the other of the slits 3h. In addition, the tapered groove 3i is opened to the rear side. Therefore, the headrest guide 3 having the tapered groove 3i can be easily molded.

In the above embodiment, the tapered groove 3i is formed on the side of the tubular portion 3a, which is surrounded by the protruding portions 3g, 3t facing each other. However, the present disclosure is not limited to such an embodiment. For example, the present disclosure is not limited to the configuration in which the tapered groove 3i is formed in the tubular portion 3a. Alternatively, a tapered groove may be formed directly in each of the slits 3h provided in the protruding portions 3g, 3t such that the vertical length thereof decreases as the tongue piece 3e is distanced from the protruding portion 3g or 3t in the right-to-left direction thereof. Even in this configuration, the plate spring 5 can be easily inserted into the slits 3h.

With regard to the relative size between the plate spring 5 and the protruding portions 3g, 3t, in FIG. 4, the right and left ends of the plate spring 5 are fitted into the slits 3h so as not to protrude from outer surfaces of the protruding portions 3g. However, the present disclosure is not limited to such a configuration. For example, the plate spring 5 may be formed such that one or both of the right and left ends of the plate spring 5 protrude from one or both of the outer surfaces of the protruding portions 3g, 3t, and the plate spring 5 may be positioned by the positioning protrusion 3j and the through-hole 5a with one or both of the ends of the plate spring 5 protruding from one or both of the outer surfaces of the protruding portions 3g, 3t. In this configuration, an operator can hold one or both of the ends of the plate spring 5, thereby facilitating insertion and extraction of the plate spring 5 into and from the slits 3h to enhance ease of maintenance.

In the above descriptions, the slits 3h are elongated in the up-to-down direction to extend in the right-to-left direction. However, the present disclosure is not limited to such a configuration. For example, the slits 3h can have any shape and tilt angle in accordance with the tongue piece 3e such that a pressing force applied from the plate spring 5, the both ends of which are held by the slits 3h, is effectively transmitted to the tongue piece 3e.

Function of Tongue Piece and Plate Spring

Figure 7:
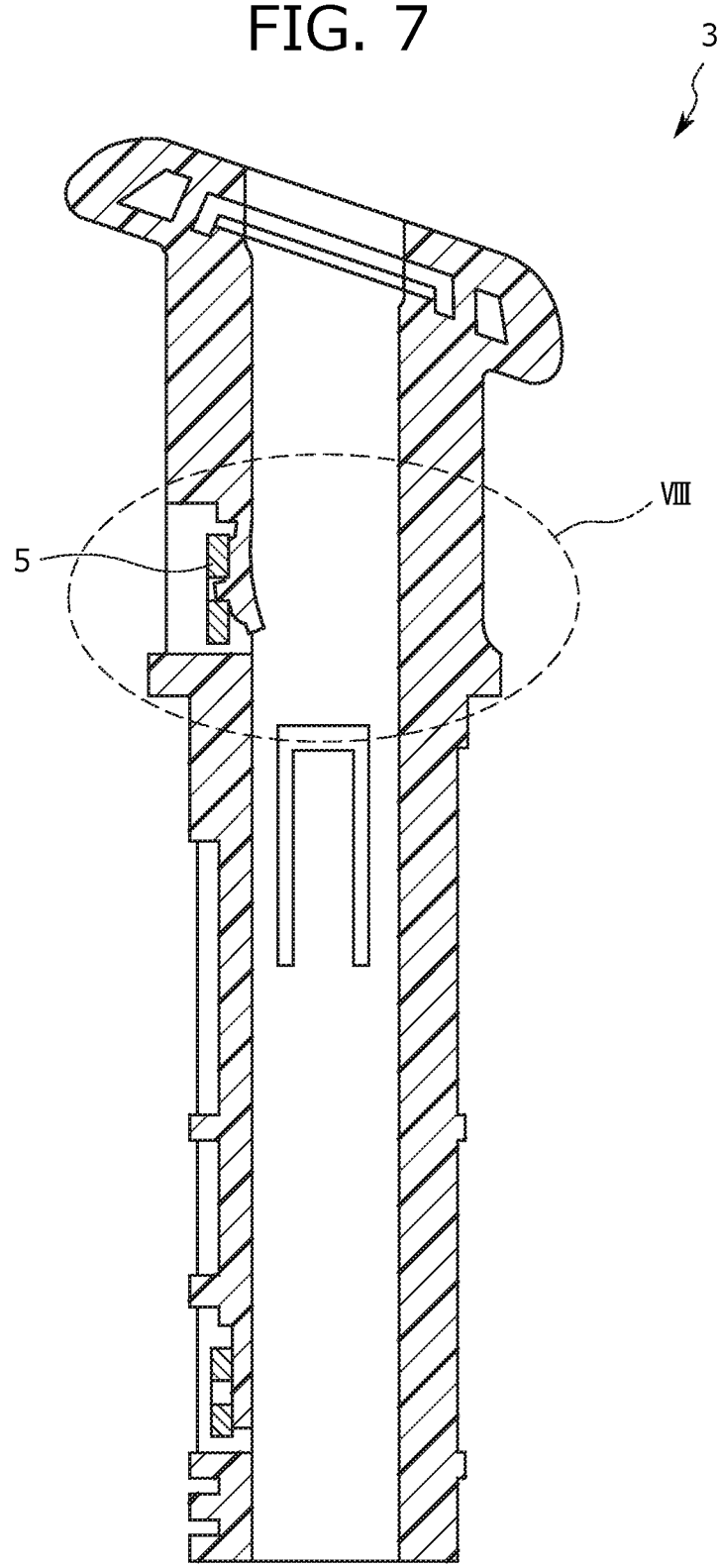
FIG. 7 is a cross-sectional view of the headrest guide taken along line VII-VII of FIG. 3, according to an embodiment.
Figure 8A:
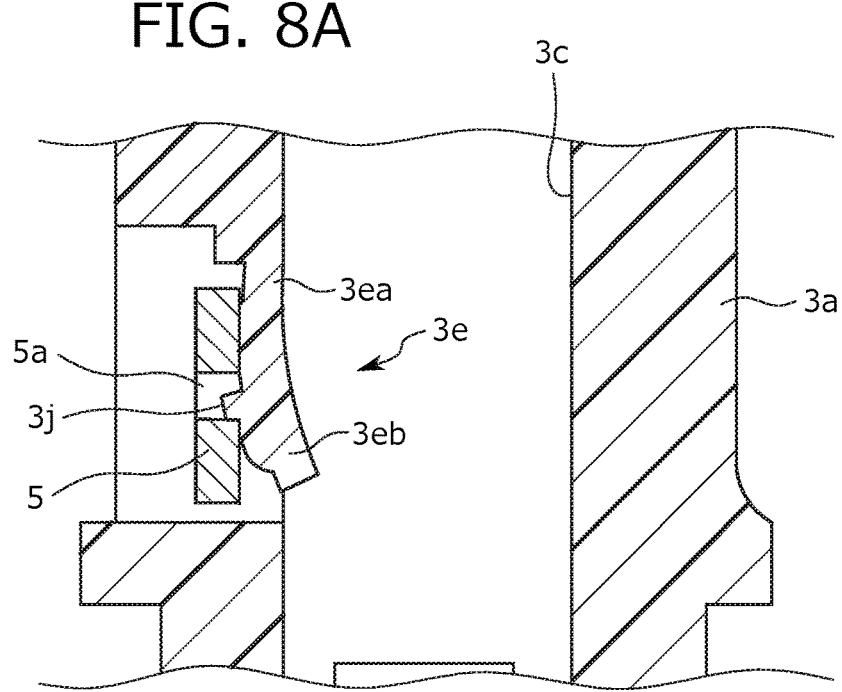
FIG. 8A is an enlarged view of the headrest guide showing the portion VIII of FIG. 7 and is an explanatory drawing illustrating a state before a headrest stay is inserted, according to an embodiment.
Figure 8B:
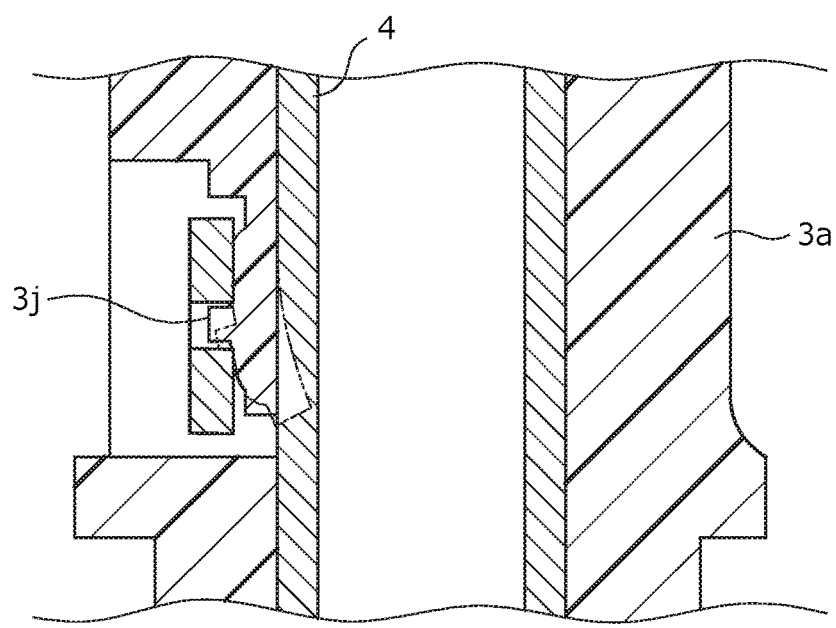
FIG. 8B is an enlarged view of the headrest guide showing the portion VIII of FIG. 7 in a state where the headrest stay is inserted and is an explanatory drawing illustrating a state after a tongue piece is deformed, according to an embodiment.

Next, the function of the tongue piece 3e and the plate spring 5 before and after the headrest stay 4 is inserted into the headrest guide 3 is described with reference to FIGS. 7, 8A and 8B. FIG. 7 is a cross-sectional view of the headrest guide 3 taken along line VII-VII of FIG. 3, according to an embodiment. FIG. 8A is an enlarged view of the headrest guide 3 showing the portion VIII of FIG. 7 and is an explanatory drawing illustrating a state before the headrest stay 4 is inserted. FIG. 8B is an enlarged view of the headrest guide 3 showing the portion VIII of FIG. 7 in a state where the headrest stay 4 is inserted and is an explanatory drawing illustrating a state after the tongue piece 3e is deformed.

As shown in FIG. 8A, the tongue piece 3e is deformed such that the free end 3eb protrudes from the inner surface of the insertion hole 3c of the tubular portion 3a as described above, in a state where the plate spring 5 is attached to the protruding portions 3g, 3t. In addition, the plate spring 5 is provided to overlap the tongue piece 3e from the outside in the radial direction of the tubular portion 3a.

Therefore, when the headrest stay 4 is inserted into the insertion hole 3c from the upper side of the headrest guide 3, as shown in FIG. 8B, the headrest stay 4 is brought into contact with the tongue piece 3e to press the tongue piece 3e outwardly in the radial direction of the tubular portion 3a. In addition, the center portion of the plate spring 5 is deflected radially outward by the movement of the tongue piece 3e. Therefore, a radially inward load is applied to the headrest stay 4 via the tongue piece 3e by a restoring force of the plate spring 5; thereby, the movement of the headrest stay 4 can be restricted.

Modified Example

Figure 9:
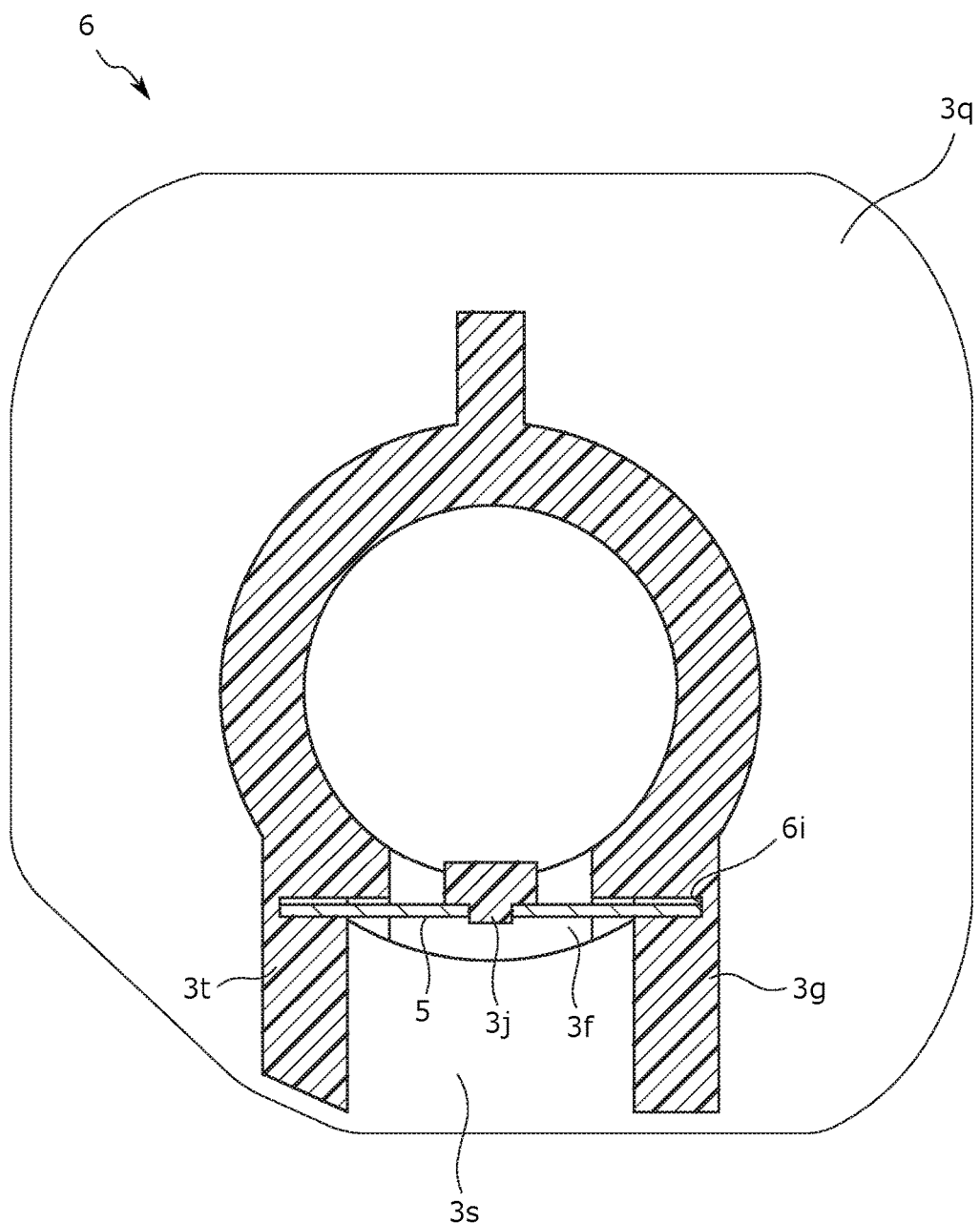
FIG. 9 is a cross-sectional view of a headrest guide according to a modified example of the embodiment of the present disclosure, the cross-section generally corresponding to FIG. 6.

The slits 3h shown in FIG. 6 are preferably provided in the respective protruding portions 3g, 3t of the headrest guide 3 because the plate spring 5 can be inserted into the slits 3h from either of the protruding portions 3g, 3t. However, the present disclosure is not limited to such a configuration. Alternatively, the present disclosure may be applied to an embodiment of a headrest guide 6 configured as shown in FIG. 9. Next, the headrest guide 6 according to a modified example of the embodiment of the present disclosure is described with reference to FIG. 9. FIG. 9 is a cross-sectional view of the headrest guide 6 showing a cross-section according to the modified example, the cross-section of FIG. 9 being similar to the cross-section shown in FIG. 6. In the descriptions below, identical reference numerals are assigned to components having the same configuration as the components described in the above embodiment, and descriptions thereof are omitted and the differences therebetween are explicitly described.

In the headrest guide 6, recesses 6i are formed in respective surfaces of the protruding portions 3g, 3t, which face each other. Each of the recesses 6i has the same width and height as the slit 3h according to the above embodiment but is different from the slit 3h in that the recess 6i does not extend through each of the protruding portions 3g, 3t. Even in this configuration, the plate spring 5 in a bent state is inserted into the recesses 6i from the rear side to which the recessed portion 3s is opened. Then, the plate spring 5 is returned to a normal state. Thus, the both ends of the plate spring 5 can be attached into the recesses 6i. According to this configuration, the movement of the plate spring 5 in the right-to-left direction can be restricted by not only the positioning protrusion 3j but also ends of the recesses 6i, thereby enhancing the mounting stability of the plate spring 5.

In addition, a configuration in which the slit 3h is formed in one of the protruding portions 3g, 3t and the recess 6i for holding the plate spring 5 is formed in the surface of the other of the protruding portions 3g, 3t may be applied. Particularly in this case, one of the protruding portions 3g, 3t in which the slit 3h is formed may preferably be located in the right-to-left direction at the side at which the knob operation portion 3d is provided in the head portion 3b, namely, at the right side in the present embodiment. In this configuration, the knob operation portion 3d and the plate spring 5 that configure the headrest guide 3 are assembled from the same direction, therefore facilitating the assembly operation.

Furthermore, not only the plate spring but also a resilient material such as a U-shaped pin forming a portion of the outline of the plate spring, a disc spring, or a coil spring may be used as the resilient member as long as the resilient member can press radially inward against the tongue piece of the tubular portion. As described above, the slit 3h extends in the same direction as the operating direction of the knob operation portion 3d. However, the slit 3h may extend in any direction. For example, the slit 3h may extend in the front-to-back direction relative to the tubular portion 3a such that the plate spring 5 can be inserted into the slit 3h from the rear side of the tubular portion 3a.

The invention claimed is:

1. A headrest guide into which a stay for supporting a headrest is inserted, comprising:
    a tubular portion that extends in a first direction and into which the stay is inserted;
    a stay contact portion that is provided to bend in a radial direction of the tubular portion and is configured to be brought into contact with the stay; and
    a resilient member that presses against the stay contact portion inwardly in the radial direction of the tubular portion;
    wherein:
       holding portions are disposed on opposite sides of the tubular portion, respectively, with the stay contact portion interposed between the opposite sides, to hold the resilient member at opposite end sides thereof;
       the stay contact portion extends in the first direction in which the tubular portion extends;
       the resilient member is a plate spring that extends in a second direction that intersects with the first direction in which the tubular portion extends;
       each of the holding portions is composed of a protruding portion that includes a slit and protrudes outwardly from the tubular portion; and
       the plate spring is fittedly inserted into the slit.

2. The headrest guide according to claim 1, wherein the slit extends in the first direction in which the tubular portion extends.

3. The headrest guide according to claim 1, wherein a guiding portion is provided on a side of the holding portion where the plate spring is inserted and guides the insertion of the plate spring into the slit.

4. The headrest guide according to claim 1, wherein:
    a positioning portion is provided on a side of the stay contact portion where the resilient member is provided and determines a mounting position of the resilient member; and
    the positioning portion is provided between the holding portions that are disposed on the opposite sides of the tubular portion, respectively, with the stay contact portion interposed between the opposite sides.

5. The headrest guide according to claim 1, wherein:
    two or more of the holding portions are provided to hold the opposite ends of the resilient member and protrude outwardly from the tubular portion; and
    a connecting portion is provided in the tubular portion to connect at least two of the holding portions.

6. The headrest guide according to claim 5, wherein:
    a rib is provided on an outer periphery of the tubular portion to protrude outwardly; and
    the connecting portion is connected with the rib.

7. The headrest guide according to claim 1, wherein:
    one end of the stay contact portion is a free end and an other end of the stay contact portion is a fixed end; and
    the resilient member is in contact with the stay contact portion at a position different from the other end of the stay contact portion.

8. The headrest guide according to claim 7, wherein:
    a positioning portion is provided on the side of the stay contact portion where the resilient member is provided and determines the mounting position of the resilient member; and the positioning portion is provided on a side of the stay contact portion at the one end.

* * * * *